(12) United States Patent
Madawat et al.

(10) Patent No.: US 11,403,165 B2
(45) Date of Patent: Aug. 2, 2022

(54) COGNITIVE DISASTER RECOVERY WORKFLOW MANAGEMENT

(71) Applicant: Kyndryl, Inc., New York, NY (US)

(72) Inventors: Sukumar Madawat, Bengaluru (IN);
Satish Kinikiri, Bengaluru (IN);
Sameer Kumar, Bengaluru (IN)

(73) Assignee: Kyndryl, Inc., New York, NY (US)

( * ) Notice: Subject to any disclaimer, the term of this patent is extended or adjusted under 35 U.S.C. 154(b) by 303 days.

(21) Appl. No.: 16/861,364

(22) Filed: Apr. 29, 2020

(65) Prior Publication Data

US 2021/0342214 A1 Nov. 4, 2021

(51) Int. Cl.
*G06F 11/00* (2006.01)
*G06F 11/07* (2006.01)
*G06F 3/0482* (2013.01)
*G06F 40/40* (2020.01)

(52) U.S. Cl.
CPC ........ *G06F 11/0793* (2013.01); *G06F 3/0482* (2013.01); *G06F 11/079* (2013.01); *G06F 11/0751* (2013.01); *G06F 11/0787* (2013.01); *G06F 40/40* (2020.01)

(58) Field of Classification Search
CPC ............. G06F 11/0793; G06F 11/0751; G06F 11/0787; G06F 11/079
See application file for complete search history.

(56) References Cited

U.S. PATENT DOCUMENTS

| | | | |
|---|---|---|---|
| 9,836,365 B2 | 12/2017 | Ray | |
| 11,086,710 B2* | 8/2021 | Raghunathan | ...... G06F 11/0751 |
| 11,294,755 B2* | 4/2022 | Vah | ........................ G06F 11/079 |
| 2009/0125751 A1* | 5/2009 | Dawson | .............. G06F 11/1402 714/2 |
| 2009/0172460 A1* | 7/2009 | Bobak | ................. G06F 11/0709 714/E11.122 |
| 2010/0121520 A1* | 5/2010 | Yukawa | .............. G06F 11/0793 701/31.4 |

(Continued)

FOREIGN PATENT DOCUMENTS

WO WO2017066383 A1 4/2017

OTHER PUBLICATIONS

"A Framework Approach to Ensuring Application Recovery Readiness," White Paper, Sanovi DRM, an IBM Company, 8 pages.

(Continued)

*Primary Examiner* — Elmira Mehrmanesh
(74) *Attorney, Agent, or Firm* — Yee & Associates, P.C.

(57) ABSTRACT

Generating a new disaster recovery workflow is provided. In response to determining that a failed action was detected during execution of a disaster recovery workflow, reasons and fixes corresponding to the failed action are acquired from a data source. A set of correlated corrective actions that are potential fixes for the failed action is identified based on natural language processing of the reasons and fixes corresponding to the failed action. A weightage value is assigned to each correlated corrective action in the set of correlated corrective actions based on a plurality of factors to form a set of corrective actions with weightage values. A recommended new disaster recovery workflow is generated by embedding the set of corrective actions with weightage values within the disaster recovery workflow.

19 Claims, 6 Drawing Sheets

(56) References Cited

U.S. PATENT DOCUMENTS

| | | | |
|---|---|---|---|
| 2011/0022879 A1 | 1/2011 | Chavda et al. | |
| 2015/0317221 A1 | 11/2015 | Sampath et al. | |
| 2016/0004582 A1* | 1/2016 | Nagura | G06F 11/3419 714/15 |
| 2017/0126477 A1* | 5/2017 | Ponnuswamy | H04L 61/2015 |
| 2018/0107534 A1 | 4/2018 | Angeles et al. | |
| 2019/0122160 A1* | 4/2019 | Kolandaiswamy | G06F 11/3688 |
| 2021/0224265 A1* | 7/2021 | Madan | G06N 20/00 |

OTHER PUBLICATIONS

"Disaster Recovery Automation Offering," IT Infrastructure Services, Tata Consultancy Services Ltd (TCS), 4 pages. https://www.tcs.com/content/dam/tcs/pdf/Services/technology-operations/Disaster-Recovery-Automation-Offering-Brochure.pdf.

"Predefined Workflow—DR Testing," Commvault Systems, Inc., V11 Service Pack 10, Accessed Nov. 22, 2019, 3 pages. https://documentation.commvault.com/commvault/v11_sp10/article?p=features/workflow/templates/dr_testing.htm.

* cited by examiner

COGNITIVE DISASTER RECOVERY WORKFLOW MANAGEMENT

BACKGROUND

1. Field

The disclosure relates generally to any workflow and more specifically to building a knowledgebase from historical data of disaster recovery workflow executions and analyzing the historical data in the knowledgebase corresponding to failed disaster recovery workflow executions to generate recommended new disaster recovery workflows with embedded corrective actions to increase a success rate of disaster recovery workflow executions.

2. Description of the Related Art

To achieve high availability and disaster recovery of a computing environment, client workloads need to be monitored and tested. In the event of a disaster, the client workload on a failed computing environment must be restarted on a failover computing environment. Disaster recovery involves a set of policies and procedures to enable the recovery or continuation of information technology ("IT") infrastructure and systems following a disaster.

A disaster can be anything that puts a business's operations at risk (e.g., cyberattack, power outage, equipment failure, natural disaster, manmade disaster, and the like). A goal of disaster recovery is for a business to continue operating as close to normal as possible. The disaster recovery process includes planning and testing and may involve a separate physical backup site for restoring operations. The disaster recovery process helps in designing strategies that can restore hardware, applications, network equipment, power, connectivity, and data quickly for business continuity. A disaster recovery test examines each action step in a disaster recovery workflow for the potential of failure.

SUMMARY

According to one illustrative embodiment, a computer-implemented method for generating a new disaster recovery workflow is provided. In response to a computer determining that a failed action was detected during execution of a disaster recovery workflow, the computer acquires reasons and fixes corresponding to the failed action from a data source. The computer identifies a set of correlated corrective actions that are potential fixes for the failed action based on natural language processing of the reasons and fixes corresponding to the failed action. The computer assigns a weightage value to each correlated corrective action in the set of correlated corrective actions based on a plurality of factors to form a set of corrective actions with weightage values. The computer generates a recommended new disaster recovery workflow by embedding the set of corrective actions with weightage values within the disaster recovery workflow. According to other illustrative embodiments, a computer system and computer program product for generating a new disaster recovery workflow are provided.

DETAILED DESCRIPTION

Figures 1, 6:
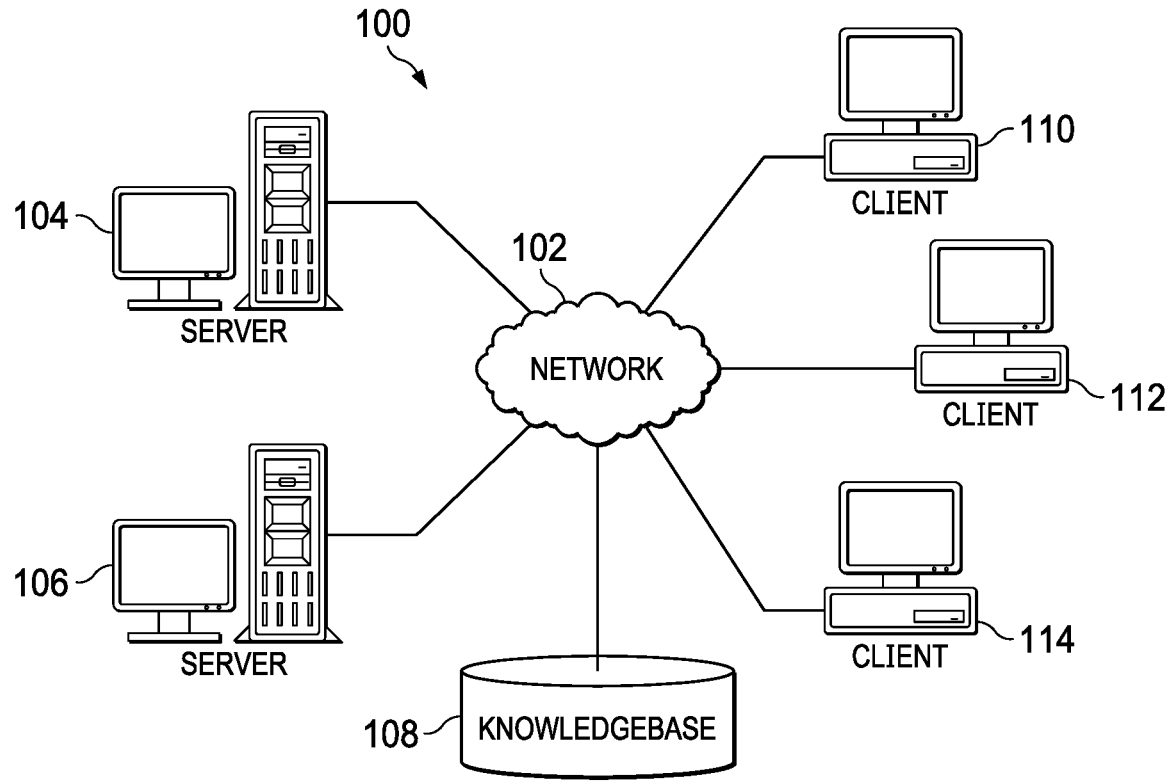
FIG. 1 is a pictorial representation of a network of data processing systems in which illustrative embodiments may be implemented.
FIG. 6 is a diagram illustrating an example of a weightage store in accordance with an illustrative embodiment.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
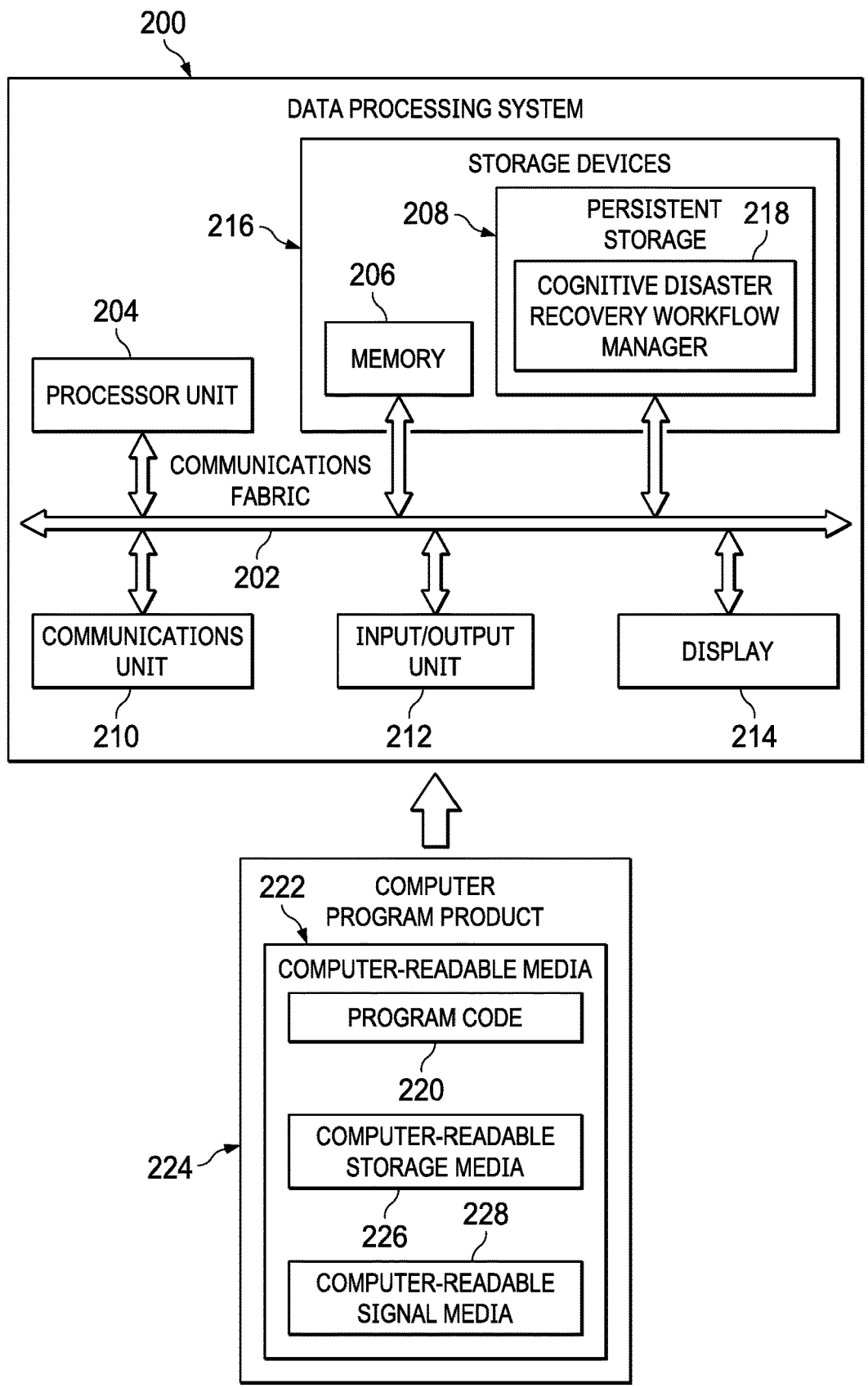
FIG. 2 is a diagram of a data processing system in which illustrative embodiments may be implemented.
Figure 3:
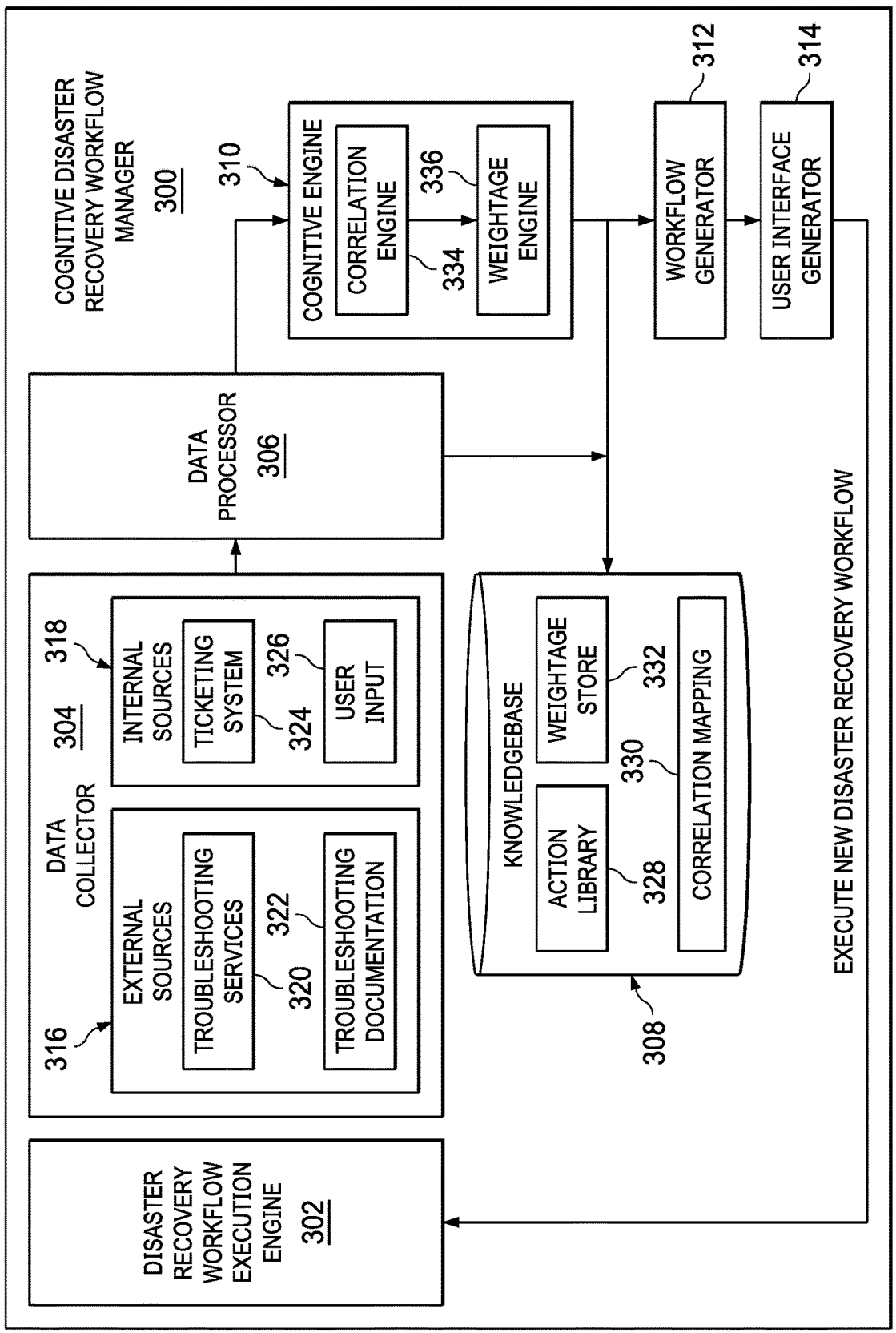
FIG. 3 is a diagram illustrating an example of a cognitive disaster recovery workflow manager in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, fiber optic cables, and the like.

In the depicted example, server 104 and server 106 connect to network 102, along with knowledgebase 108. Server 104 and server 106 may be, for example, server computers with high-speed connections to network 102. Also, server 104 and server 106 may each represent a cluster of servers in one or more data centers. Alternatively, server 104 and server 106 may each represent multiple computing nodes in one or more cloud environments.

In addition, server 104 and server 106 can provide cognitive disaster recovery workflow management services to client devices corresponding to registered users (e.g., disaster recovery administrators). For example, server 104 and server 106 can build knowledgebase 108 based on historical data regarding previous disaster recovery workflow executions. Further, server 104 and server 106 can analyze the historical data in the knowledgebase corresponding to one or more failed actions during disaster recovery workflow executions. Based on the analysis of the historical data, server 104 and server 106 can generate a new disaster recovery workflow with embedded corrective actions to resolve failed workflow actions and increase the success rate of executing disaster recovery workflows. However, it should be noted that illustrative embodiments are not limited to disaster recovery workflows only. In other words, illustrative embodiments can analyze any type of workflow execution with failed actions and generate a new workflow with embedded corrective actions to resolve the failed actions of any workflow.

Client 110, client 112, and client 114 also connect to network 102. Clients 110, 112, and 114 are clients of server 104 and server 106. In this example, clients 110, 112, and 114 are shown as desktop or personal computers with wire communication links to network 102. However, it should be noted that clients 110, 112, and 114 are examples only and may represent other types of data processing systems, such as, for example, workstations, laptop computers, handheld computers, smart phones, smart televisions, kiosks, and the like, with wire or wireless communication links to network 102. Registered users of clients 110, 112, and 114 may utilize clients 110, 112, and 114 to access and utilize the cognitive disaster recovery workflow management services provided by server 104 and server 106.

Knowledgebase 108 is a network storage device capable of storing any type of data in a structured format or an unstructured format. In addition, knowledgebase 108 may represent a plurality of network storage devices. Further, knowledgebase 108 may store an action library of all available workflow actions, a correlation mapping of previously failed actions to corrective actions, a weightage store of weightage values corresponding to corrective actions, identifiers and network addresses for a plurality of client devices, identifiers for a plurality of client device users, and the like. Furthermore, knowledgebase 108 may store other types of data, such as authentication or credential data that may include user names, passwords, and biometric data associated with client device users, such as, for example, disaster recovery administrators.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), a wide area network (WAN), a telecommunications network, or any combination thereof. FIG. 1 is intended as an example only, and not as an architectural limitation for the different illustrative embodiments.

With reference now to FIG. 2, a diagram of a data processing system is depicted in accordance with an illustrative embodiment. Data processing system 200 is an example of a computer, such as server 104 in FIG. 1, in which computer readable program code or instructions implementing processes of illustrative embodiments may be located. In this example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis or a persistent basis. Further, a computer readable storage device excludes a propagation medium. Memory 206, in these examples, may be, for example, a random-access memory (RAM), or any other suitable volatile or non-volatile storage device, such as a flash memory. Persistent storage 208 may take various forms, depending on the particular implementation. For example, persistent storage 208 may contain one or more devices. For example, persistent storage 208 may be a disk drive, a solid-state drive, a rewritable optical disk, a rewritable magnetic tape, or some combination of the above. The media used by persistent storage 208 may be removable. For example, a removable hard drive may be used for persistent storage 208.

In this example, persistent storage 208 stores cognitive disaster recovery workflow manager 218. However, it should be noted that even though cognitive disaster recovery workflow manager 218 is illustrated as residing in persistent storage 208, in an alternative illustrative embodiment cognitive disaster recovery workflow manager 218 may be a separate component of data processing system 200. For example, cognitive disaster recovery workflow manager 218 may be a hardware component coupled to communication fabric 202 or a combination of hardware and software components. In another alternative illustrative embodiment, a first set of components of cognitive disaster recovery workflow manager 218 may be located in data processing system 200 and a second set of components of cognitive disaster recovery workflow manager 218 may be located in a second data processing system, such as, for example, server 106 in FIG. 1.

Cognitive disaster recovery workflow manager 218 controls the process of building a knowledgebase, such as, for example, knowledgebase 108 in FIG. 1, from historical data of disaster recovery workflow executions. Cognitive disaster recovery workflow manager 218 also controls the process analyzing the historical data in the knowledgebase corresponding to failed disaster recovery workflow executions to generate recommended new disaster recovery workflows with embedded corrective actions to increase a success rate of disaster recovery workflow executions.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultrahigh frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 220 is located in a functional form on computer readable media 222 that is selectively removable and may be loaded onto or transferred to data processing system 200 for running by processor unit 204. Program code 220 and computer readable media 222 form computer program product 224. In one example, computer readable media 222 may be computer readable storage media 226 or computer readable signal media 228.

In these illustrative examples, computer readable storage media 226 is a physical or tangible storage device used to store program code 220 rather than a medium that propagates or transmits program code 220. Computer readable storage media 226 may include, for example, an optical or magnetic disc that is inserted or placed into a drive or other device that is part of persistent storage 208 for transfer onto a storage device, such as a hard drive, that is part of persistent storage 208. Computer readable storage media 226 also may take the form of a persistent storage, such as a hard drive, a thumb drive, or a flash memory that is connected to data processing system 200.

Alternatively, program code 220 may be transferred to data processing system 200 using computer readable signal media 228. Computer readable signal media 228 may be, for example, a propagated data signal containing program code 220. For example, computer readable signal media 228 may be an electromagnetic signal, an optical signal, or any other suitable type of signal. These signals may be transmitted over communication links, such as wireless communication links, an optical fiber cable, a coaxial cable, a wire, or any other suitable type of communications link.

Further, as used herein, "computer readable media 222" can be singular or plural. For example, program code 220 can be located in computer readable media 222 in the form of a single storage device or system. In another example, program code 220 can be located in computer readable media 222 that is distributed in multiple data processing systems. In other words, some instructions in program code 220 can be located in one data processing system while other instructions in program code 220 can be located in one or more other data processing systems. For example, a portion of program code 220 can be located in computer readable media 222 in a server computer while another portion of program code 220 can be located in computer readable media 222 located in a set of client computers.

The different components illustrated for data processing system 200 are not meant to provide architectural limitations to the manner in which different embodiments can be implemented. In some illustrative examples, one or more of the components may be incorporated in or otherwise form a portion of, another component. For example, memory 206, or portions thereof, may be incorporated in processor unit 204 in some illustrative examples. The different illustrative embodiments can be implemented in a data processing system including components in addition to or in place of those illustrated for data processing system 200. Other components shown in FIG. 2 can be varied from the illustrative examples shown. The different embodiments can be implemented using any hardware device or system capable of running program code 220.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system.

Disaster recovery solutions already exist that automate disaster recovery workflows to reduce human errors, time, and minimize risk during disaster recovery. These current solutions provide a platform to manage IT recovery with planned and unplanned failover and disaster recovery test exercises. A disaster recovery drill represents a planned disaster recovery model (i.e., switchover and switchback) with a sequence of actions (i.e., disaster recovery workflow) that brings down a production application at a production site and recovers the application at a recovery site. Disaster recovery drills need to be performed repetitively as per compliance requirements.

A disaster recovery workflow is a sequence of multiple actions configured to execute a disaster recovery process. An action is an operation in the disaster recovery workflow. An action is defined in the context of the environment where the actions is being executed. For example, an action may be: a cloud operation, such as start instance in cloud, shutdown instance in cloud, or the like; a database operation, such as start database, get database status, or the like; or an operating system operation, such as mount disk or the like.

Typically, a disaster recovery workflow fails due to misconfiguration of data center components (e.g., application, network, storage, and the like) or environmental changes (e.g., cloud infra-dependency, connectivity, and the like). A disaster recovery administrator has to manually determine the root cause of a failure and then fix the problem to complete the disaster recovery workflow. For example, in case of a disaster recovery workflow failure, the disaster recovery administrator needs to perform the following steps: analyze underlying problems and work on fixes (i.e., corrective actions); seek additional subject matter expert assistance when needed to identify and overcome the underlying problems; prepare for root cause analysis; and plan for corrective actions to avoid reoccurrence of the problems. All of these steps are time-consuming and tedious, which may have an impact on application recovery time objective. Recovery time objective is the targeted duration of time and service level within which an application must be restored after a disaster in order to avoid unacceptable consequences associated with a break in business continuity.

There is no way to determine disaster recovery workflow failure until the workflow is executed during a disaster recovery drill. If one or more actions within the disaster recovery workflow fail, then the disaster recovery administrator has to manually fix the environmental and/or configuration problems and reinitiate the disaster recovery workflow. However, illustrative embodiments automatically correlate data received from multiple sources (e.g., free form text received from the disaster recovery administrator, ticketing systems, troubleshooting systems, and the like) to identify a set of correlated corrective actions corresponding to a disaster recovery workflow having one or more failed actions during execution. Illustrative embodiments also compute weightage values for the correlated corrective actions identified by a correlation engine to increase disaster recovery workflow execution success rate. Illustrative embodiments increase the success rate of disaster recovery workflow execution completion by continuously learning from the historical data of previous disaster recovery workflow executions. In addition, illustrative embodiments can leverage and apply a workflow generated for a particular disaster recovery operation corresponding to a specific customer IT environment to another customer IT environment experiencing a same or similar failure.

Illustrative embodiments operate in two phases: 1) building the knowledgebase; and 2) recommending a new disaster recovery workflow using historical data in the knowledgebase. Illustrative embodiments cognitively build the knowledgebase from the historical data of disaster recovery workflow executions and analyze the historical data in the knowledgebase corresponding to failed disaster recovery workflow executions to generate a recommended new workflow having embedded corrective actions to correct the problem or issue associated with the failure. Thus, illustrative embodiments increase the success rate of disaster recovery workflow executions for recovering vital IT processes of a business by automatically generating new disaster recovery workflows with embedded corrective actions.

Thus, illustrative embodiments provide one or more technical solutions that overcome a technical problem with correcting disaster recovery workflows that fail during execution. As a result, these one or more technical solutions provide a technical effect and practical application in the field of disaster recovery.

With reference now to FIG. 3, a diagram illustrating an example of a cognitive disaster recovery workflow manager is depicted in accordance with an illustrative embodiment. Cognitive disaster recovery workflow manager 300 may be implemented in a server, such as server 104 in FIG. 1, or a data processing system, such as data processing system 200 in FIG. 2. For example, cognitive disaster recovery workflow manager 300 may be, for example, cognitive disaster recovery workflow manager 218 in FIG. 2. Cognitive disaster recovery workflow manager 300 is a collection of components for building a knowledgebase from historical data of disaster recovery workflow executions and analyzing the historical data in the knowledgebase corresponding to failed disaster recovery workflow executions to generate recommended new disaster recovery workflows with embedded corrective actions to increase a success rate of disaster recovery workflow executions.

In this example, cognitive disaster recovery workflow manager 300 includes disaster recovery workflow execution engine 302, data collector 304, data processor 306, knowledgebase 308, cognitive engine 310, workflow generator 312, and user interface generator 314. However, it should be noted that cognitive disaster recovery workflow manager 300 is intended as an example only and not as a limitation on illustrative embodiments. In other words, cognitive disaster recovery workflow manager 300 may include more or fewer components than shown. For example, a component may be divided into two or more components, two or more components may be combined into one component, a component may be removed, a component not shown may be added, or the like.

Cognitive disaster recovery workflow manager 300 utilizes disaster recovery workflow execution engine 302 to execute disaster recovery workflows received from client devices, such as clients 110-114 in FIG. 1, to test for action failures within the workflows. Cognitive disaster recovery workflow manager 300 utilizes data collector 304 to retrieve free form text (e.g., comments, documents, social media posts, blogs, and the like) regarding reasons for action failures and their corresponding fixes. Data collector 304 retrieves the free form text from external sources 316 and internal sources 318. In this example, external sources 316 include troubleshooting services 320 and troubleshooting documentation 322 and internal sources 318 include ticketing system 324 and user input 326. User input 326 may be, for example, input received from a disaster recovery administrator regarding workflow action failures and fixes.

Cognitive disaster recovery workflow manager 300 utilizes data processor 306 to preprocess the retrieved free form text. Data processor 306 cleans the free form text and filters out noise for utilization by knowledgebase 308 and cognitive engine 310.

Knowledgebase 308 is a repository containing identification of previously failed workflow actions, corrective actions (e.g., fixes) for failed actions that were provided by a disaster recovery administrator, and artificial intelligence-generated corrective action recommendations with assigned weightage values corresponding to failed actions. In this example, knowledgebase 308 includes action library 328, correlation mapping 330, and weightage store 332. Action library 328 is a collection of all "actions" available to cognitive disaster recovery workflow manager 300 for generating a new disaster recovery workflow. Correlation mapping 330 represents a mapping of previously failed actions to corresponding potential corrective actions. Weightage store 332 contains weightage values for respective corrective actions.

Cognitive engine 310 is an artificial intelligence-based component that utilizes, for example, machine learning, natural language processing, and the like to learn different workflow action failures and how to correct them. In this example, cognitive engine 310 includes correlation engine 334 and weightage engine 336. Correlation engine 334 generates and updates correlation mapping 330 by identifying and correlating potential corrective actions to failed actions using information retrieved by data collector 304 and information stored in knowledgebase 308. Weightage engine 336 generates weightage store 332 by assigning a weightage value to each correlated corrective action (e.g., correlated corrective actions A1, A2, A3, ... An will result in correlated corrective actions with assigned weightage values A1(a), A2(b), A3(c), ... An(z)). Weightage engine 336 calculates weightage values based on several factors, such as, for example, number of times a particular corrective action was previously used, time in minutes when that particular corrective action was last used, and whether that particular corrective action was used on a same data processing environment (e.g., server) or not.

Workflow generator 312 generates a recommended new disaster recovery workflow with embedded corrective actions to resolve the problem or issue causing the action failure based on information generated by correlation engine 334 and weightage engine 336. Cognitive disaster recovery workflow manager 300 utilizes user interface generator 314 to generate a user interface in a client device to present the recommended new disaster recovery workflow to a disaster recovery administrator for review and selection of appropriate corrective actions within the recommended new disaster recovery workflow. Cognitive disaster recovery workflow manager 300 receives the disaster recovery administrator's corrective action selections via the user interface. Cognitive disaster recovery workflow manager 300 utilizes workflow generator 312 to generate a new disaster recovery workflow based on the received corrective action selections made by the disaster recovery administrator in the user interface. Workflow generator 312 sends the new disaster recovery workflow to disaster recovery workflow execution engine 302 for execution.

Figure 4:
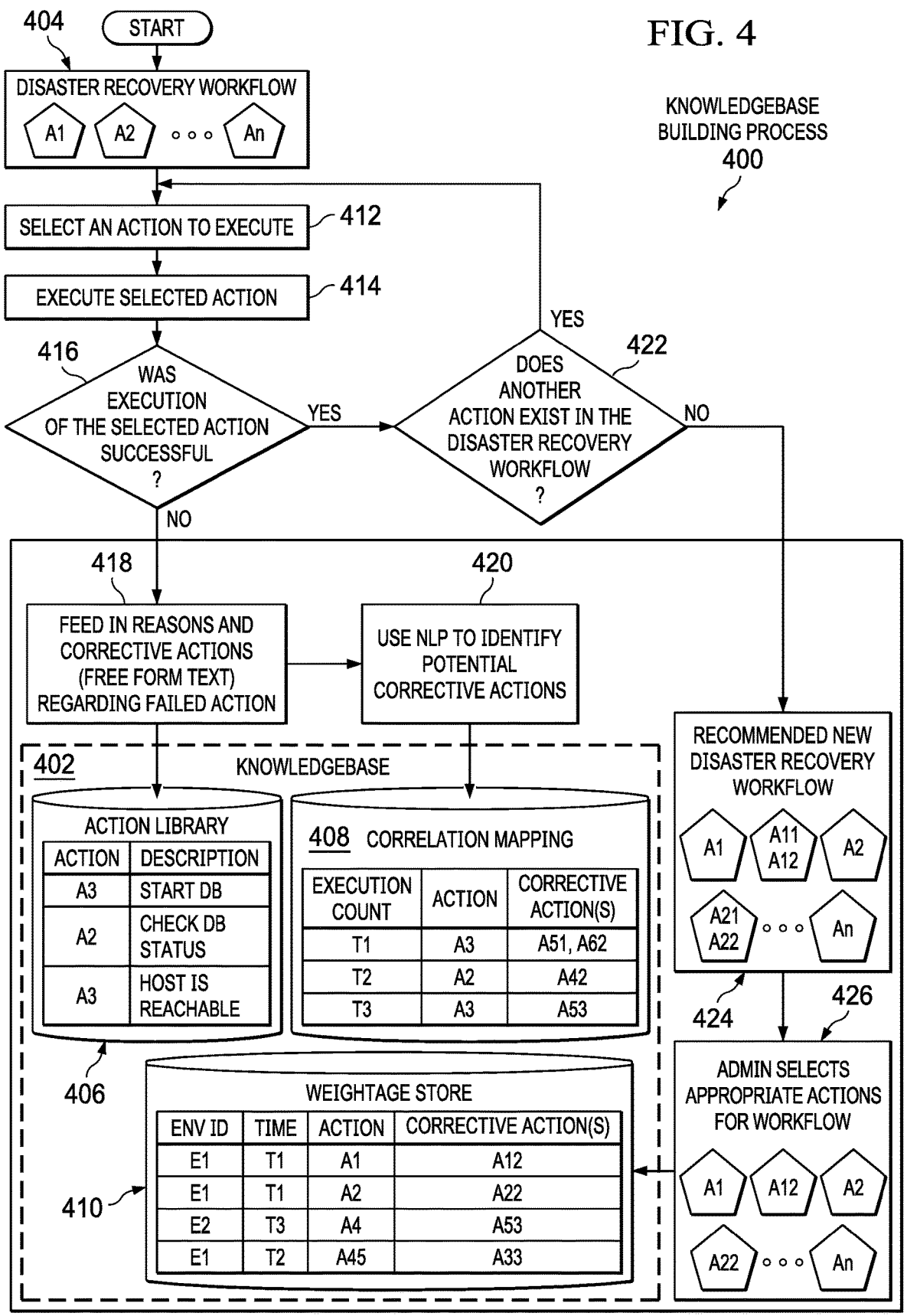
FIG. 4 is a diagram illustrating an example of a knowledgebase building process in accordance with an illustrative embodiment.

With reference now to FIG. 4, a diagram illustrating an example of a knowledgebase building process is depicted in accordance with an illustrative embodiment. Knowledgebase building process 400 may be implemented in a cognitive disaster recovery workflow manager, such as, for example, cognitive disaster recovery workflow manager 218 in FIG. 2 or cognitive disaster recovery workflow manager 300 in FIG. 3.

A cognitive engine, such as, for example, cognitive engine 310 in FIG. 3, which is a component of the cognitive disaster recovery workflow manager, builds knowledgebase 402. The cognitive engine learns from workflow executions by monitoring the workflows during execution. Upon detection of an action failure in a workflow, the cognitive engine performs several steps. For example, the cognitive engine records the time of the action failure. The cognitive engine also captures reasons for the failure. In addition, the cognitive engine captures comments in free form text, which are provided by a disaster recovery administrator and/or an external troubleshooting service regarding how the action failure was previously fixed. Based on the captured comments, a data processor, such as, for example, data processor 306 in FIG. 3, preprocesses the free form text, filters out noise, and updates correlation mapping with a set of one or more corrective actions to the failed action. The cognitive engine further captures disaster recovery administrator selections of potential corrective actions as a weightage value in a weightage store. The cognitive engine uses the weightage store to assign a priority to each potential corrective action.

In this example, knowledgebase building process 400 includes knowledgebase 402, such as, for example, knowledgebase 308 in FIG. 3, and disaster recovery workflow 404. Knowledgebase 402 includes action library 406, correlation mapping 408, and weightage store 410, such as, for example, action library 328, correlation mapping 330, and weightage store 332 in FIG. 3. Disaster recovery workflow 404 includes actions A1, A2, . . . An.

At 412, the cognitive disaster recovery workflow manager selects an action (e.g., action A1) in disaster recovery workflow 404 to execute. At 414, the cognitive disaster recovery workflow manager executes the selected action. At 416, the cognitive disaster recovery workflow manager makes a determination as to whether execution of the selected action was successful.

If the execution of the selected action was unsuccessful, then the cognitive disaster recovery workflow manager feeds in reasons and corrective actions, in free form text, regarding the failed action into action library 406 at 418. At 420, the cognitive disaster recovery workflow manager uses natural language processing to identify potential corrective actions and update correlation mapping 408 with the identified potential corrective actions.

If the execution of the selected action was successful, then the cognitive disaster recovery workflow manager makes a determination as to whether another action exists in disaster recovery workflow 404 at 422. If another action does exist in disaster recovery workflow 404, then the cognitive disaster recovery workflow manager selects another action (e.g., action A2) in disaster recovery workflow 404 to execute. If another action does not exist in disaster recovery workflow 404, then the cognitive disaster recovery workflow manager generates recommended new disaster recovery workflow 424.

In this example, recommended new disaster recovery workflow 424 includes action A1, potential corrective actions A11 and A12, action A2, potential corrective actions A21 and A 22, . . . An. The cognitive disaster recovery workflow manager presents recommended new disaster recovery workflow 424 in a user interface for a disaster recovery administrator to review and make selections from the potential corrective actions. At 426, the disaster recovery administrator selects the appropriate corrective actions (i.e., A12 and A22) for the new disaster recovery workflow. Thus, in this example the new disaster recovery workflow contains actions A1, A12, A2, A22, . . . An. The cognitive disaster recovery workflow manager updates weightage store 410 with information regarding the corrective action selections by the disaster recovery administrator.

Figure 5:
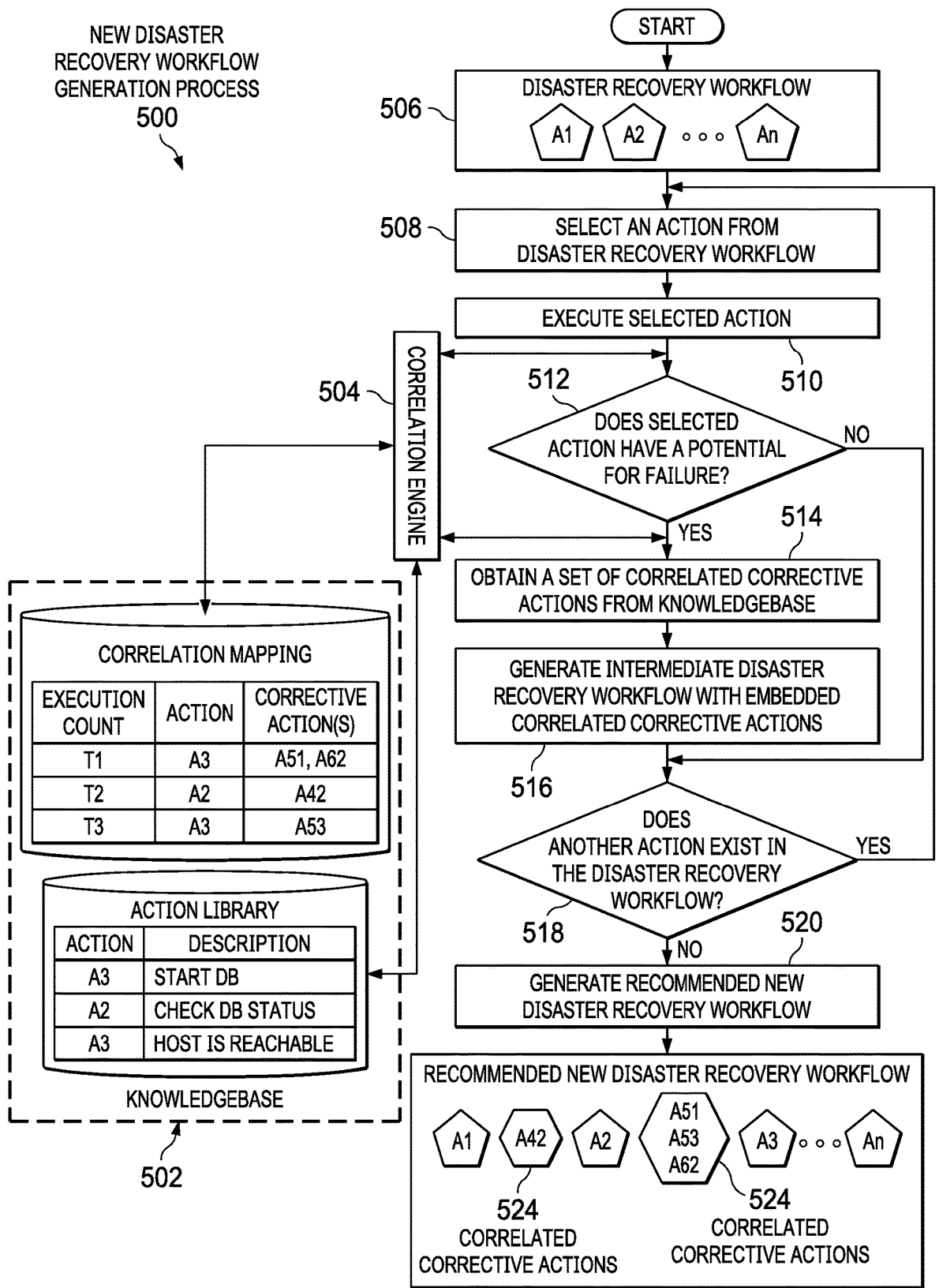
FIG. 5 is a diagram illustrating an example of a new disaster recovery workflow generation process in accordance with an illustrative embodiment.

With reference now to FIG. 5, a diagram illustrating an example of a new disaster recovery workflow generation process is depicted in accordance with an illustrative embodiment. New disaster recovery workflow generation process 500 may be implemented in a cognitive disaster recovery workflow manager, such as, for example, cognitive disaster recovery workflow manager 218 in FIG. 2 or cognitive disaster recovery workflow manager 300 in FIG. 3.

The cognitive disaster recovery workflow manager analyses a disaster recovery workflow for action failures and recommends a new disaster recovery workflow with corrective actions embedded within the new disaster recovery workflow. The cognitive disaster recovery workflow manager utilizes the knowledgebase to obtain corrective actions needed to successfully complete a given disaster recovery workflow.

The cognitive disaster recovery workflow manager first selects an action from the disaster recovery workflow to execute, executes the selected action, and then determines whether the selected action executed successfully. If the selected action failed during execution, then the cognitive disaster recovery workflow manager identifies potential corrective actions for the failure using correlation mapping. In addition, the cognitive disaster recovery workflow manager assigns a weightage value to each of the potential corrective actions using a weightage store. The cognitive disaster recovery workflow manager generates a recommended disaster recovery workflow with embedded corrective actions based on the potential corrective actions identified in the correlation mapping and their assigned weightage values. The cognitive disaster recovery workflow manager presents the recommended disaster recovery workflow to the disaster recovery administrator for review and selection of appropriate corrective actions to generate a final disaster recovery workflow. The cognitive disaster recovery workflow manager stores the final disaster recovery workflow. Further, the cognitive disaster recovery workflow manager may publish the final disaster recovery workflow for others experiencing the same or similar action failure to use.

As an example illustration, assume that an original disaster recovery workflow includes six actions (i.e., "A1", "A2", "A3", "A4", "A5", and "A6"). Also assume that action A3 failed previously. The disaster recovery administrator manually fixed the action A3 failure. The cognitive disaster recovery workflow manager captured the action failure and fixes in the knowledgebase. Using the information in the knowledgebase, the cognitive disaster recovery workflow manager correlates the disaster recovery administrator's manual fix of the A3 failure to actions "Aj" and "Ak" (i.e., action Aj or Ak needs to run prior to action A3 in the workflow). As a result, the cognitive disaster recovery workflow manager recommends the following corrective action A3→Aj, Ak. Further, assume that action A5 also failed previously and that the disaster recovery administrator manually fixed the action A5 failure. The cognitive disaster recovery workflow manager correlates the disaster recovery administrator's manual fix of the action A5 failure to actions "Ax" and "Ay" (i.e., action Ax or Ay needs to run prior to action A5 in the workflow). As a result, the cognitive disaster recovery workflow manager recommends the following corrective action A5→Ax, Ay using the information in the knowledgebase.

Then, the cognitive disaster recovery workflow manager utilizes information in the weightage store to assign a priority ("p") (i.e., weightage) to each recommended corrective action. As a result, the cognitive disaster recovery workflow manager for failed action A3 assigns priority (p1) to corrective action Aj and priority (p2) to corrective action Ak. For failed action A5, the cognitive disaster recovery workflow manager assigns priority (p2) to corrective action Ax and priority (p1) to corrective action Ay. It should be noted that priority (p1) is a higher priority value that priority (p2). Thus, the cognitive disaster recovery workflow manager generates a recommended new disaster recovery workflow that includes the following embedded corrective actions with priority:

A1-A2-[Aj(p1), Ak(p2)]-A3-A4-[Ax(p2), Ay(p1)]-A5-A6.

The cognitive disaster recovery workflow manager presents the recommended new disaster recovery workflow with embedded corrective actions and corresponding priority in a user interface for the disaster recovery administrator to review and select appropriate corrective actions. In this example, assume the disaster recovery administrator selected Aj and Ay in the recommended new disaster recovery workflow. As a result, the cognitive disaster recovery workflow manager generates a final disaster recovery workflow of:

A1, A2, Aj, A3, A4, Ay, A5, A6.

In this example, new disaster recovery workflow generation process 500 includes knowledgebase 502, correlation engine 504, and disaster recovery workflow 506. Disaster recovery workflow 506 includes actions A1, A2, . . . An.

At 508, the cognitive disaster recovery workflow manager selects an action from disaster recovery workflow 506. At 510, the cognitive disaster recovery workflow manager executes the selected action. At 512, the cognitive disaster recovery workflow manager makes a determination as to whether the selected action has a potential for failure based on the execution.

If the selected action has a potential for failure, then the cognitive disaster recovery workflow manager obtains a set of correlated corrective actions corresponding to the failed action from knowledgebase 502 at 514. At 516, the cognitive disaster recovery workflow manager generates an intermediate disaster recovery workflow with embedded correlated corrective actions.

If the selected action has no potential for failure, then the cognitive disaster recovery workflow manager makes a determination as to whether another action exists in disaster recovery workflow 506 at 518. If another action does exist in disaster recovery workflow 506, then the cognitive disaster recovery workflow manager selects another action from disaster recovery workflow 506. If another action does not exist in disaster recovery workflow 506, then the cognitive disaster recovery workflow manager generates a recommended new disaster recovery workflow at 520 based on the intermediate disaster recovery workflows generated at 516.

In this example, recommended new disaster recovery workflow 522 includes correlated corrective actions 524. As a result, recommended new disaster recovery workflow 522 is action A1, correlated corrective action A42, action A2, correlated corrective actions A51, A53, and A62, action A3, . . . An. The cognitive disaster recovery workflow manager presents recommended new disaster recovery workflow 522 in a user interface for a disaster recovery administrator to review and make appropriate corrective action selections.

With reference now to FIG. 6, a diagram illustrating an example of a weightage store is depicted in accordance with an illustrative embodiment. Weightage store 600 may be implemented in a knowledgebase, such as, for example, knowledgebase 308 in FIG. 3. Weightage store 600 includes corrective actions 602 and factors 604.

In this example, corrective actions 602 include corrective actions A1, A2, and A3. However, it should be noted that corrective actions 602 may include any number and type of corrective actions. Factors 604 include previously used count (c), most recently used (time in minutes) (t), and used on same server (affinity) (a).

The functionality of a weightage engine, such as, for example, weightage engine 336 in FIG. 3, evaluates and assigns a weightage value to each corrective action in a set of one or more potential corrective actions identified by a cognitive engine, such as, for example, cognitive engine 310 in FIG. 3. The weightage engine assigns a weightage value to a potential corrective action based on factors 604. Previously used count (c) equals the number of times a particular corrective action was used previously. Most recently used (time in minutes) (t) represents when a particular corrective action was last used (i.e., how long ago in minutes). Used on same server (affinity) (a) represents whether a particular corrective action was used on a same server or not.

The weightage engine utilizes a function f( ) which reads the values of (c), (t), and (a) corresponding to each potential corrective action and sorts the potential corrective actions in order of applicability starting from greatest potential corrective action to least potential corrective action. For example, the cognitive engine identifies actions A1, A2, and A3 as potential corrective actions for failed action Az. Reading the values of (c), (t), and (a) corresponding to each of actions A1, A2, and A3, the function f( ) sorts the potential corrective actions as A3, A1, and A2 based on: action A3 having been used the most (i.e., three times), having been used most recently (i.e., one minute ago), and having been used on the same server (i.e., yes); A1 having been used second most (i.e., two times), having been used least recently (i.e., four minutes ago), and having been used on the same server (i.e., yes); and A2 having been used least (i.e., one time), having been used second most recently (i.e., two minutes ago), and not having been used on the same server (i.e., no). As a result, f(A1,A2,A3)=(A3,A1,A2). Consequently, the weightage engine recommends usage of corrective action A3(p1) from among corrective actions A1(p2), A2(p3), and A3(p1), where (p) represents the priority of a respective corrective action.

Figure 7:
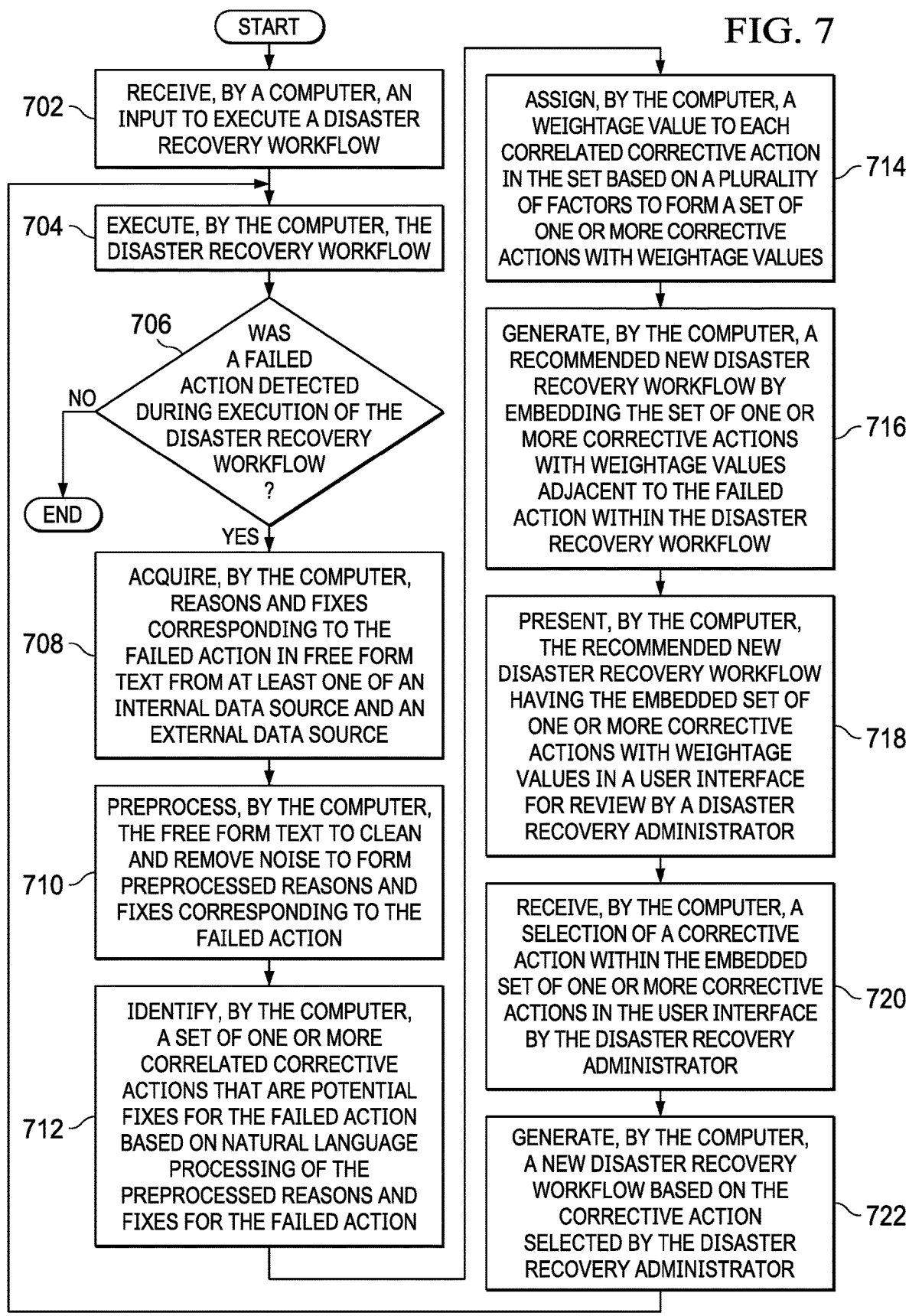
FIG. 7 is a flowchart illustrating a process for generating a recommended new disaster recovery workflow with embedded corrective actions and their corresponding weightages in accordance with an illustrative embodiment.

With reference now to FIG. 7, a flowchart illustrating a process for generating a recommended new disaster recovery workflow with embedded corrective actions and their corresponding weightages is shown in accordance with an illustrative embodiment. The process shown in FIG. 7 may be implemented in a computer, such as, for example, server 104 in FIG. 1 or data processing system 200 in FIG. 2.

The process begins when the computer receives an input to execute a disaster recovery workflow (step 702). The computer executes the disaster recovery workflow (step 704). The computer makes a determination as to whether a failed action was detected during execution of the disaster recovery workflow (step 706).

If the computer determines that no failed action was detected during execution of the disaster recovery workflow, no output of step 706, then the process terminates thereafter. If the computer determines that a failed action was detected during execution of the disaster recovery workflow, yes output of step 706, then the computer acquires or receives reasons and fixes corresponding to the failed action in free form text from at least one of an internal data source and an external data source (step 708).

The computer preprocesses the free form text to clean and remove noise to form preprocessed reasons and fixes corresponding to the failed action (step 710). The computer identifies a set of one or more correlated corrective actions that are potential fixes for the failed action based on natural language processing of the preprocessed reasons and fixes corresponding to the failed action (step 712). In addition, the computer assigns a weightage value to each correlated corrective action in the set based on a plurality of factors to form a set of one or more corrective actions with weightage values (step 714).

Afterward, the computer generates a recommended new disaster recovery workflow by embedding the set of one or more corrective actions with weightage values adjacent to the failed action within the disaster recovery workflow (step 716). The computer presents the recommended new disaster recovery workflow having the embedded set of one or more corrective actions with weightage values in a user interface for review by a disaster recovery administrator (step 718).

Subsequently, the computer receives a selection of a corrective action within the embedded set of one or more corrective actions in the user interface by the disaster recovery administrator (step 720). The computer generates a new disaster recovery workflow based on the corrective action selected by the disaster recovery administrator (step 722). Thereafter, the process returns to step 704 where the computer executes the new disaster recovery workflow.

Thus, illustrative embodiments of the present invention provide a computer-implemented method, computer system, and computer program product for building a knowledgebase from historical data of disaster recovery workflow executions and analyzing the historical data in the knowledgebase corresponding to failed disaster recovery workflow executions to generate recommended new disaster recovery workflows with embedded corrective actions to increase a success rate of disaster recovery workflow executions. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for generating a new disaster recovery workflow, the computer-implemented method comprising:
responsive to a computer determining that a failed action was detected during execution of a disaster recovery workflow, acquiring, by the computer, reasons and fixes corresponding to the failed action from a data source;
identifying, by the computer, a set of correlated corrective actions that are potential fixes for the failed action based on natural language processing of the reasons and fixes corresponding to the failed action;
assigning, by the computer, a weightage value to each correlated corrective action in the set of correlated corrective actions based on a plurality of factors to form a set of corrective actions with weightage values, wherein the plurality of factors includes a number of times a particular corrective action was used previously, a time when the particular corrective action was last used, and whether the particular corrective action was used on a same data processing environment or not; and
generating, by the computer, a recommended new disaster recovery workflow by embedding the set of corrective actions with weightage values within the disaster recovery workflow.

2. The computer-implemented method of claim 1 further comprising:
presenting, by the computer, the recommended new disaster recovery workflow having an embedded set of corrective actions with weightage values in a user interface for review by a user; and
receiving, by the computer, a selection of a corrective action within the embedded set of corrective actions in the user interface by the user.

3. The computer-implemented method of claim 2 further comprising:
generating, by the computer, the new disaster recovery workflow based on the corrective action selected by the user; and
executing, by the computer, the new disaster recovery workflow.

4. The computer-implemented method of claim 1 further comprising:
building, by the computer, a knowledgebase from historical data of disaster recovery workflow executions; and
analyzing, by the computer, historical data in the knowledgebase corresponding to failed disaster recovery workflow executions to generate the recommended new disaster recovery workflow with an embedded set of corrective actions and corresponding weightage values to increase a success rate of disaster recovery workflow execution.

5. The computer-implemented method of claim 4, wherein the knowledgebase includes an action library of all available workflow actions, a correlation mapping of previously failed actions mapped to potential corrective actions, and a weightage store of weightage values assigned to each corrective action.

6. The computer-implemented method of claim 1, wherein the disaster recovery workflow is a sequence of multiple actions configured to execute a disaster recovery process, and wherein an action is an operation in the disaster recovery workflow.

7. The computer-implemented method of claim 1, wherein the reasons and fixes corresponding to the failed action obtained from the data source are in free form text, and further comprising:

preprocessing, by the computer, the free form text to clean and remove noise to form preprocessed reasons and fixes corresponding to the failed action.

8. The computer-implemented method of claim 1, wherein the data source is at least one of an internal data source and an external data source, and wherein the internal data source includes a ticketing system and user input, and wherein the external data source includes troubleshooting services and troubleshooting documentation.

9. The computer-implemented method of claim 1, wherein the computer embeds the set of corrective actions with weightage values adjacent to the failed action within the disaster recovery workflow.

10. A computer system for generating a new disaster recovery workflow, the computer system comprising:

a bus system;
a storage device connected to the bus system, wherein the storage device stores program instructions; and
a processor connected to the bus system, wherein the processor executes the program instructions to:
acquire reasons and fixes corresponding to a failed action from a data source in response to determining that the failed action was detected during execution of a disaster recovery workflow;
identify a set of correlated corrective actions that are potential fixes for the failed action based on natural language processing of the reasons and fixes corresponding to the failed action;
assign a weightage value to each correlated corrective action in the set of correlated corrective actions based on a plurality of factors to form a set of corrective actions with weightage values, wherein the plurality of factors includes a number of times a particular corrective action was used previously, a time when the particular corrective action was last used, and whether the particular corrective action was used on a same data processing environment or not; and
generate a recommended new disaster recovery workflow by embedding the set of corrective actions with weightage values within the disaster recovery workflow.

11. The computer system of claim 10, wherein the processor further executes the program instructions to:

present the recommended new disaster recovery workflow having an embedded set of corrective actions with weightage values in a user interface for review by a user; and
receive a selection of a corrective action within the embedded set of corrective actions in the user interface by the user.

12. The computer system of claim 11, wherein the processor further executes the program instructions to:

generate the new disaster recovery workflow based on the corrective action selected by the user; and
execute the new disaster recovery workflow.

13. The computer system of claim 10, wherein the processor further executes the program instructions to:

build a knowledgebase from historical data of disaster recovery workflow executions; and
analyze historical data in the knowledgebase corresponding to failed disaster recovery workflow executions to generate the recommended new disaster recovery workflow with an embedded set of corrective actions and corresponding weightage values to increase a success rate of disaster recovery workflow execution.

14. The computer system of claim 13, wherein the knowledgebase includes an action library of all available workflow actions, a correlation mapping of previously failed actions mapped to potential corrective actions, and a weightage store of weightage values assigned to each corrective action.

15. A computer program product for generating a new disaster recovery workflow, the computer program product comprising a computer readable storage medium having program instructions embodied therewith, the program instructions executable by a computer to cause the computer to perform a method comprising:

responsive to the computer determining that a failed action was detected during execution of a disaster recovery workflow, acquiring, by the computer, reasons and fixes corresponding to the failed action a data source;
identifying, by the computer, a set of correlated corrective actions that are potential fixes for the failed action based on natural language processing of the reasons and fixes corresponding to the failed action;
assigning, by the computer, a weightage value to each correlated corrective action in the set of correlated corrective actions based on a plurality of factors to form a set of corrective actions with weightage values, wherein the plurality of factors includes a number of times a particular corrective action was used previously, a time when the particular corrective action was last used, and whether the particular corrective action was used on a same data processing environment or not; and
generating, by the computer, a recommended new disaster recovery workflow by embedding the set of corrective actions with weightage values within the disaster recovery workflow.

16. The computer program product of claim 15 further comprising:

presenting, by the computer, the recommended new disaster recovery workflow having an embedded set of corrective actions with weightage values in a user interface for review by a user; and
receiving, by the computer, a selection of a corrective action within the embedded set of corrective actions in the user interface by the user.

17. The computer program product of claim 16 further comprising:

generating, by the computer, a new disaster recovery workflow based on the corrective action selected by the user; and
executing, by the computer, the new disaster recovery workflow.

18. The computer program product of claim 15 further comprising:

building, by the computer, a knowledgebase from historical data of disaster recovery workflow executions; and
analyzing, by the computer, historical data in the knowledgebase corresponding to failed disaster recovery workflow executions to generate the recommended new disaster recovery workflow with an embedded set of corrective actions and corresponding weightage values to increase a success rate of disaster recovery workflow execution.

19. The computer program product of claim 18, wherein the knowledgebase includes an action library of all available workflow actions, a correlation mapping of previously failed actions mapped to potential corrective actions, and a weightage store of weightage values assigned to each corrective action.

* * * * *